United States Patent [19]

Faessler et al.

[11] Patent Number: 5,181,402
[45] Date of Patent: Jan. 26, 1993

[54] CABLE LOCK ASSEMBLY

[76] Inventors: Court Faessler, c/o Anvil Way, Surrey, British Columbia, V3S-4N7; Kirk J. MacKenzie, 11763 100th Ave., Surrey, British Columbia, both of Canada

[21] Appl. No.: 839,730

[22] Filed: Feb. 19, 1992

Related U.S. Application Data

[63] Continuation of Ser. No. 668,977, Mar. 13, 1991, abandoned.

[30] Foreign Application Priority Data

Sep. 7, 1990 [CA] Canada ................................ 2024882

[51] Int. Cl.⁵ .............................................. B65D 27/30
[52] U.S. Cl. ....................................... 70/18; 24/16 PB; 292/307 B; 292/318
[58] Field of Search ................. 70/14, 18, 30, 49, 50; 24/16 PS, 30.5 P, 166; 292/307 R, 307 A, 307 B, 318, 319, 327

[56] References Cited

U.S. PATENT DOCUMENTS

| | | | |
|---|---|---|---|
| 353,526 | 11/1886 | Yarger | 24/166 |
| 1,573,579 | 2/1926 | Ross | 292/327 X |
| 1,870,040 | 8/1932 | Dietze | 292/307 B |
| 4,057,983 | 11/1977 | Morgan | 70/18 |
| 4,275,485 | 6/1981 | Hutchison | 24/30.5 P |
| 4,325,238 | 4/1982 | Scherbing | 70/18 |
| 4,415,190 | 11/1983 | Finck, Jr. | 292/327 X |
| 4,564,163 | 1/1986 | Barnett | 24/16 PB |
| 4,571,787 | 2/1986 | Furutsu | 24/16 PB |
| 4,650,925 | 3/1987 | Coldren | 24/16 PB |
| 4,711,002 | 12/1987 | Kreeger | 292/318 X |

Primary Examiner—Renee S. Luebke
Assistant Examiner—Suzanne L. Dino
Attorney, Agent, or Firm—Andrus, Sceales, Starke & Sawall

[57] ABSTRACT

A cable lock assembly for the bundling of lengths of material such as logs includes a lock affixed to a first end of a cable. One of a number of buttons rigidly affixed to the cable at a second end thereof may be placed is a complementarily shaped socket in a base of the lock. The button may be retained in the socket by a cover which is rotatably connected to the base and may be releasably secured thereto in its button retaining closed position. The cable lock assembly of the present invention is easy to handle without the requirement of specific tools and is reusable, thus reducing operating costs. Slipping of the cable through the lock in the closed position of the cover is substantially prevented, thus improving the reliability of the cable lock assembly.

15 Claims, 6 Drawing Sheets

CABLE LOCK ASSEMBLY

This application is a continuation of Ser. No. 07/668,977, filed Mar. 13, 1991, now abandoned.

BACKGROUND OF THE INVENTION

1. Field of the Invention

The present invention relates to cable locks, in particular to cable locks for the bundling of lengths of wood.

2. Brief Description of the Prior Art

During logging operations, lengths of wood or logs which are produced by cutting and debranching of trees, are generally hauled over unimproved terrain and access roads to a logging camp by using cable skidding. Subsequently, the logs are transported from the logging camp to a sawmill or other wood processing installation by trucks or barges. During transport, the logs are generally bundled for safety and ease of handling.

Cable lock assemblies conventionally include a cable and a cable lock. One or more cables are generally laid in a loop around the logs to be bundled and tightened to form the bundle. To secure the bundle the free ends of each cable are fastened together at their crossover point by the cable lock. A number of different cable lock assemblies, which are mainly distinguished by their lock constructions, are known in the art. One device includes a cable a hollow, cast lock and a wedge. The cable ends are pulled through the lock in the same direction and are prevented from slipping through the lock by a wedge which is driven between the ends of the cable or between the cable ends and the lock. It is a disadvantage of such a cable lock assembly that tools are needed for the installation and removal of the wedge. It is a further disadvantage that forcing the wedge against the cable and the lock casting will eventually lead to serious damage of both the cable and the lock thus reducing the service period of such a cable lock assembly. Furthermore, since a hammer is generally used for installation to the wedge, damage of the wedge frequently occurs.

In another cable lock assembly the free ends of the cable are pulled through a sleeve which fittingly receives the cable ends in opposite directions. Subsequently, the sleeve is crimped to prevent the cable ends from sliding therethrough and along each other. It is a disadvantage of such a cable lock assembly that hydraulic or pneumatic crimpers are required to provide a crimping force which is sufficiently high to prevent cable slipping. Due to the high force employed, damage to the cable frequently occurs. It is a further disadvantage that the crimped sleeve must be destroyed to release the cable ends for opening of the bundle, thus ruling out any reuse of the sleeve and increasing operating costs.

The present invention provides a cable lock assembly which is easy to handle, obviates the requirement for tools for the fastening and release of the cable ends, has a substantially lower occurrence of damage to the cable and the lock, and is readily reusable thus reducing operating costs.

SUMMARY OF THE INVENTION

Accordingly, the invention provides a cable lock assembly used, for example, for the bundling of lengths of material which assembly includes a lock affixable to a cable, the lock including a base having a socket for at least partly fittingly receiving a button affixable to the cable and means for retaining the button in the socket. In a preferred embodiment, the cable lock assembly includes a lock which is affixable to a cable, includes a base which has a socket to at least partly, fittingly receive one of at least one button affixable to the cable and a cover releasably fastened to the base for retaining the one button in the socket, the one button, when affixed to the cable, being spaced along the cable from the lock so that a loop is formed in the cable when the button is retained in the socket. Thus, the cable is substantially prevented from slipping through the lock when the one button is retained in the socket.

In another preferred embodiment, the lock is fastened to a first end of the cable through a thimble engaging an eyelet of the lock. The base is preferably provided with a socket for fittingly receiving at least part of a button and cable grooves each coaxially adjacent the socket for receiving at least part of the cable extending from both ends of a button located in the socket. The socket is preferably of semi-circular cross-section to at least partly receive one button of substantially cylindrical shape and extends centrally along a top surface of the base defining an axial direction. In a further preferred embodiment, the cover and the base are rotatably connected along one of their axially outer edges. The lock is preferably provided with a latch means to releasably fasten the cover in a closed position wherein an underside of the rotatable cover engages the button for retaining the button in the socket. The latch means may include a latch nose, which is integral with the cover and, in the closed position of the cover engages a latch socket of the base, a first bore axially piercing the base to both sides of the latch socket, a second bore extending in axial direction through the latch nose in such a way that it is co-axial with the first bore in the closed position of the cover, and a pin, such as a split pin which may be selectively inserted into the coaxial first and second bores to secure the cover in the closed condition.

BRIEF DESCRIPTION OF THE DRAWINGS

The invention will now be further described by way of example only and with reference to the following drawings, wherein.

DESCRIPTION OF THE PREFERRED EMBODIMENTS

Figure 1:
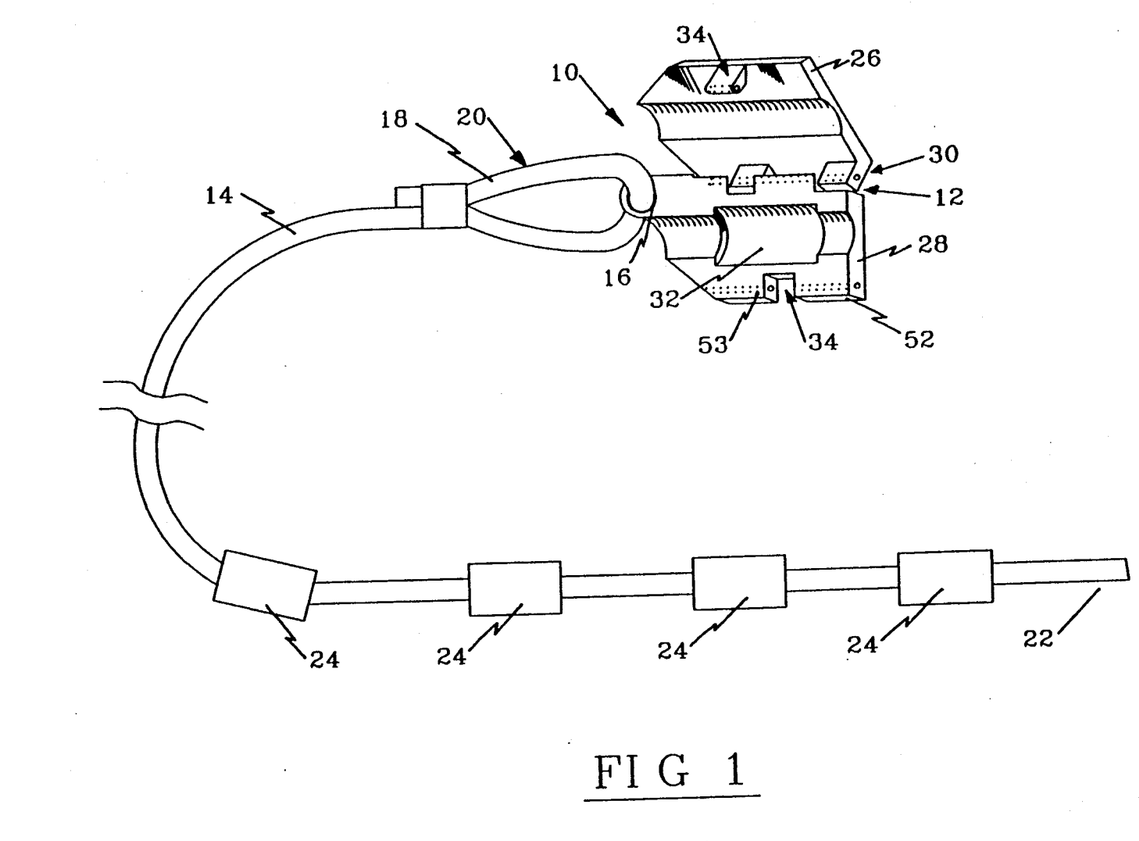
FIG. 1 is a perspective view of a cable lock assembly in accordance with the invention, with the lock in the open condition.
Figure 2:
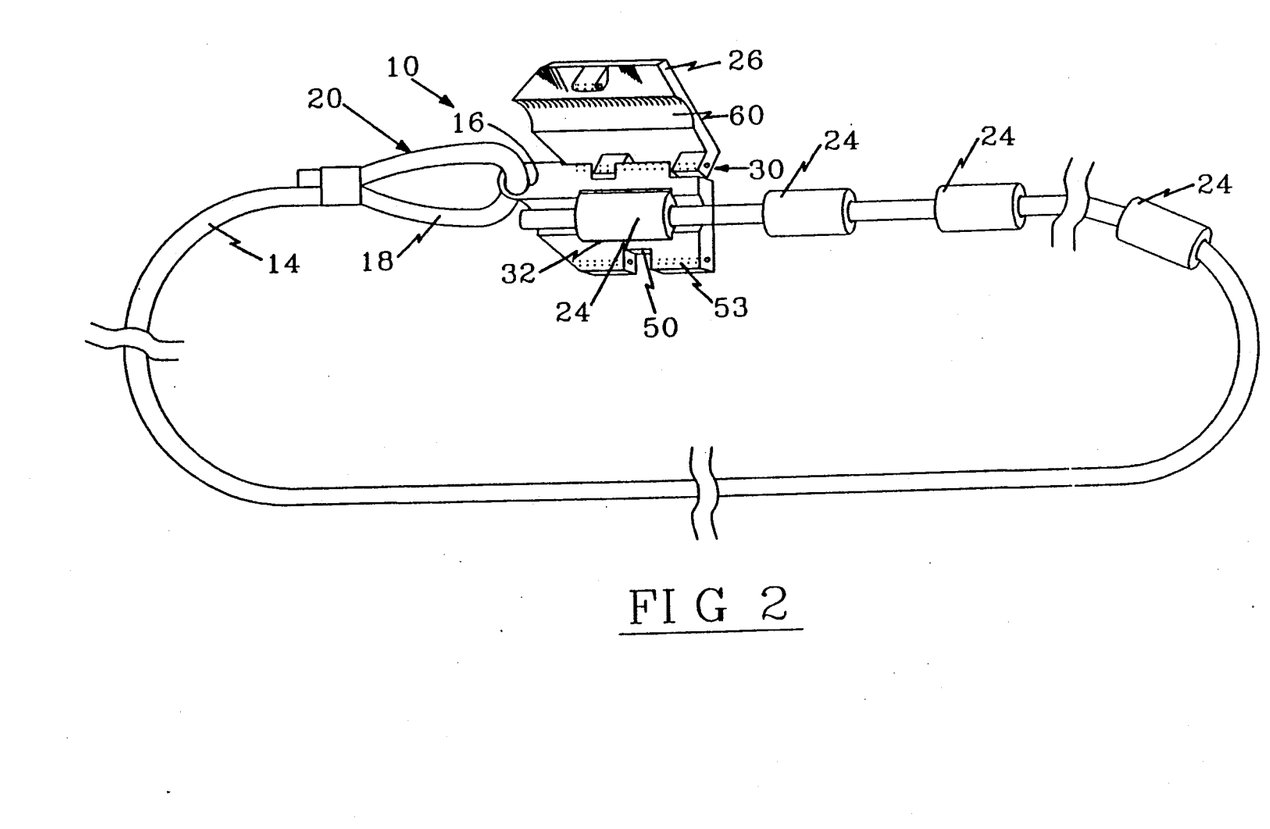
FIG. 2 is a perspective view of the cable lock assembly shown in FIG. 1, a button being placed in the socket of the open lock.
Figure 3:
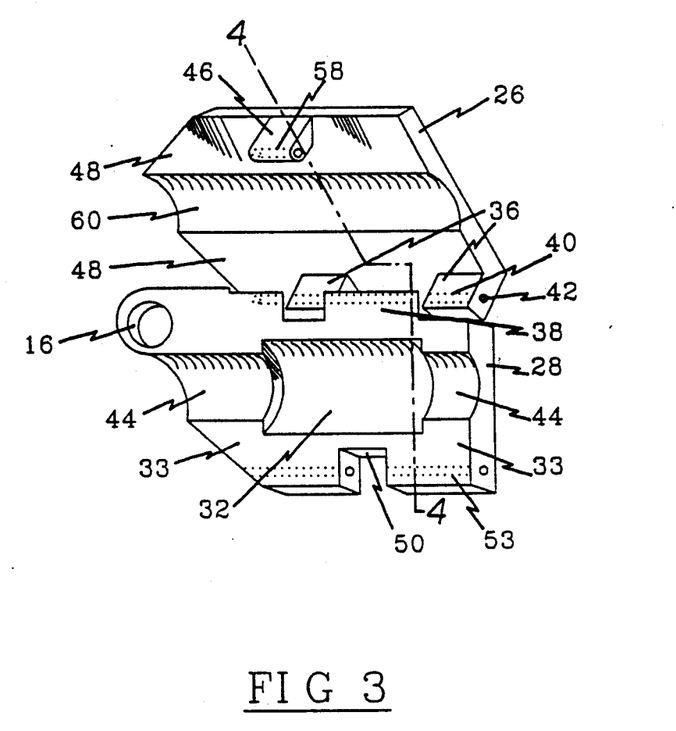
FIG. 3 is a perspective view of the lock of the cable lock assembly shown in FIG. 1.
Figure 4:
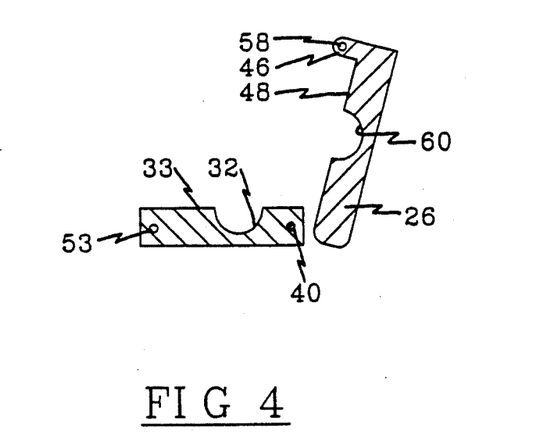
FIG. 4 is a cross section along line IV—IV of the lock shown in FIG. 3.
Figure 5:
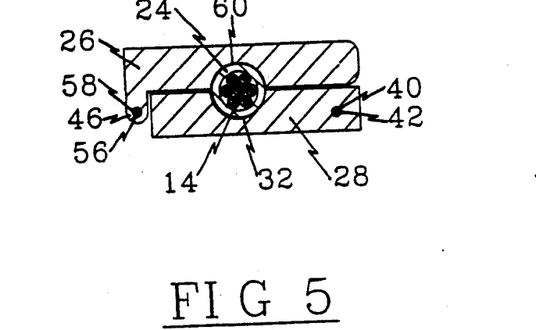
FIG. 5 is an axial cross-section of the lock shown in FIG. 3.
Figure 6:
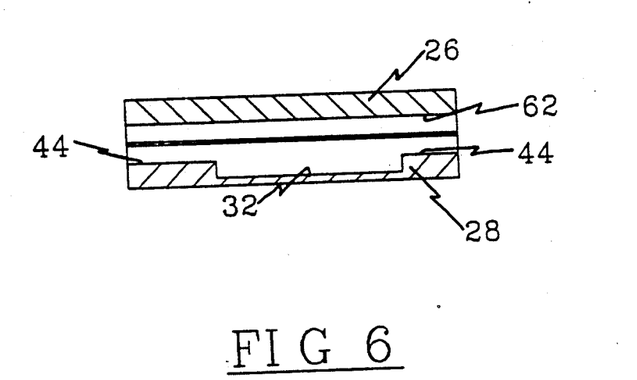
FIG. 6 is a transverse cross-section of a closed lock of a cable lock assembly in accordance with the invention, the lock enclosing a button.

In a preferred embodiment, the cable lock assembly of the invention as shown in FIG. 1, in the following generally referred to by reference numeral 10, includes a lock 12 and a cable 14 affixed at a first end 20 to an eyelet 16 of lock 12 through a thimble 18. At a second end 22, cable 14 is provided with one or more equally sized and shaped, spaced apart cylindrical buttons 24, which are permanently affixed to cable 14, for example, through casting, welding or crimping. Lock 12 includes a cover 26 which is rotatably connected to a base 28 through a hinge 30, the construction of which will be described below in detail. Any one of cylindrical buttons 24 may be placed in a complementary socket 32 of semicircular cross-section extending in axial direction of lock 12 in a top surface 33 of base 28. Button 24 may be retained in socket 32 by rotating cover 26 into engagement with button 24 only or with base 28 and button 24. Cover 26 may be locked in this position through a latch 34 which will be described in detail, to prevent cable 14 from slipping through lock 12. As is readily apparent from FIG. 3, cable 14 forms a loop when one of the cylindrical buttons 24 is secured in lock 12. The size of the loop may be adjusted by selecting an appropriate button 24 for insertion into socket 32. The loop size may be increased or decreased by selecting a button 24 which is located farther away from or closer to lock 12 respectively.

Figure 7:
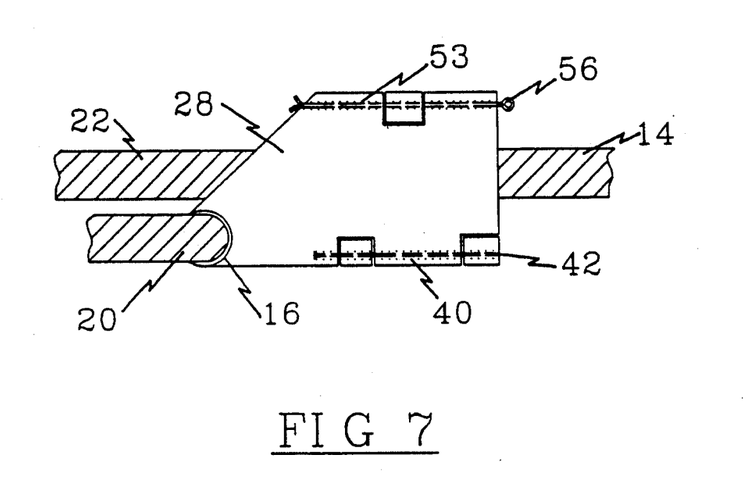
FIG. 7 is a bottom view of a closed lock of a cable lock assembly in accordance with the invention, the lock enclosing a button.
Figure 8:
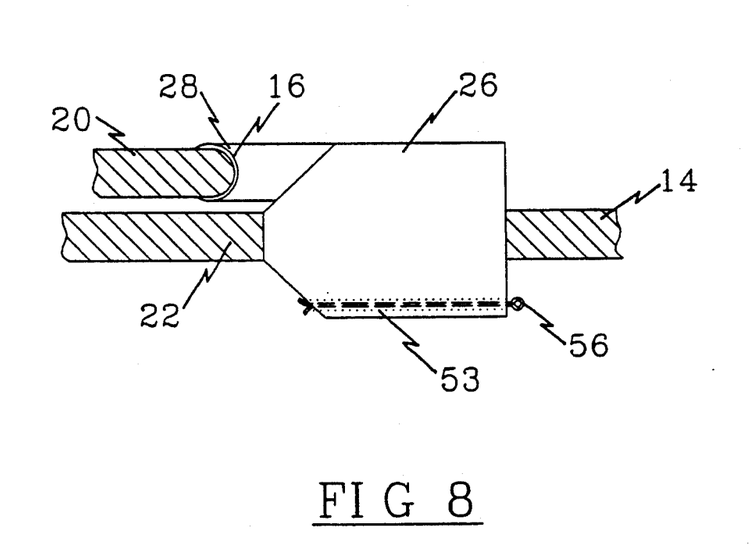
FIG. 8 is a top view of a closed lock of the cable lock assembly shown in FIG. 7.

Turning now to FIGS. 3 to 6, hinge 30 includes outer and inner hinge knuckles 36 and 38 which are integral with cover 26 and base 28 respectively and are provided with a central bore 40 which extends therethrough in an axial direction and is adapted to receive a hinge pin 42. Outer and inner hinge knuckles 36, 38 are provided with rounded edges to allow rotation of cover 26 around hinge bolt 42. Cover 26 is provided with a central button groove 60 of substantially semicircular cross-section which extends in axial direction from end to end of an underside 27 of cover 26 and is exactly opposite socket 32 in the closed position of cover 26 to reliably retain a button 24 in socket 32 (see FIGS. 4 and 6). Central button groove 60 is adapted to receive part of button 24 inserted in socket 32. Latch 34 includes a latch nose 46 centrally positioned along an axially outer edge of underside 27 remote from hinge 30. Latch 34 further includes a latch socket 50 remote from hinge 30 and centrally positioned along an axially outer edge 52 of base 28. Latch socket 50 is adapted to receive latch nose 46 in the closed condition of cover 26. A first bore 53 pierces base 28 in axial direction parallel to outer surface 52 and extends to both sides of and communicates with latch socket 50. Latch nose 46 is pierced in axial direction by a second bore 58. First and second bores 53, 58 are co-axial in the closed condition of cover 26 so that a lock pin 56, preferably a split pin, may be inserted therethrough to secure cover 26 in its closed condition (see FIGS. 6 and 7). Base 28 is further provided with central axial cable grooves 44, which extend coaxial from and communicate with both ends of socket 32 in upper surface 33 (see FIG. 5) and are adapted to receive those parts of cable 14 which are adjacent that button 24 which is placed in socket 32. Of course, cover 26 may also include a mirror image of the socket-cable groove combination of base 28 instead of central button groove 60 for further improvement of the reliability of lock 12. As is apparent from FIGS. 1 to 8, cable lock assembly 10 of the present invention is preferably used by laying cable 14 in a loop around a number of logs to be bundled, tightening the cable around the logs to form the bundle, inserting that button 24 which is closest to open lock 12, after tightening of cable 14, into socket 32 in such a way that first and second ends 20 and 22 of cable 14 are extending from the same axial end of lock 12, closing cover 26 to retain button 24 in socket 32 and inserting latch pin 56 into co-axial first and second bores 53, 58 to secure cover 26 in its closed position. It is readily understood, that additional cable lock assemblies in accordance with the invention may be positioned around the same bundle of logs at various locations for further securing of the bundle. After the bundle has bee transported to its destination, such as a sawmill, the individual logs contained in the bundle may be released by reversing the above described bundling procedure.

Figure 9:
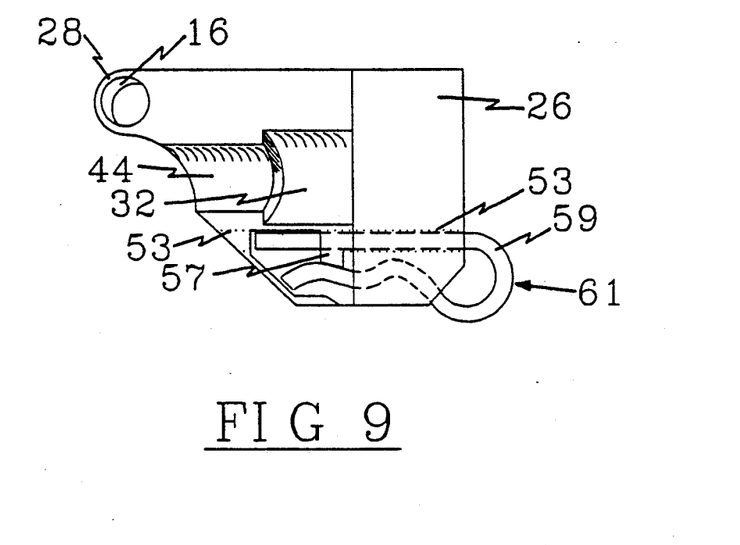
FIG. 9 is a top view of a preferred embodiment of the cable lock assembly shown in FIGS. 7 and 8.

In a preferred embodiment of the heretofore described cable lock assembly 10 in accordance with the invention, cover 26 and base 28 have been extended in transverse direction beyond first bore 53 and latch nose 46 to overlap and protect a hitch pin 59. Hitch pin 59 is removably inserted into first bore 53 for locking cover 26 in a closed position. A locking nose 57 of base 28 cooperates with hitch pin 59 to retain hitch pin 59 in first bore 53. In axial direction, cover 26 is shorter than base 28, but extends sufficiently over socket 32, in its closed condition, to provide for a reliable fastening of a button 24 in socket 32. An accidental removal of hitch pin 59 and opening of cable lock assembly 10 is substantially prevented, since only a loop portion 61 of inserted hitch pin 59 projects from a closed cable lock assembly in accordance with this preferred embodiment of the invention, the remainder of hitch pin 59 being overlapped and preferably enclosed by cover 26 and base 28.

Although it is preferred for practical reasons to provide lock 12 of the heretofor described cable lock assembly 10 in accordance with the invention with a latch 34 and a hinge 30, it is readily apparent to a skilled person that hinge 30 may be replaced by at least one further latch not necessarily of the same construction as latch 34 so that lock 12 may include two or more latches to allow complete separation of cover 26 from base 28. In the alternative, other latch assemblies than the one heretofore described, including automatic latches such as snap together mechanisms may be employed to releasably secure cover 26 to base 28 as long as it is guaranteed that cover 26 will not accidentally open during transport. It will be readily apparent to a person skilled in the art, that buttons 24 may be of any cross-section such as triangular, square or rectangular and the like but that all buttons 24 on cable 14 must be the same size and shape. Socket 32 preferably has a cross-section complementary to and adapted to fittingly receive any one of buttons 24. Accordingly, a socket 32 of V-shaped cross-section is required, for example, to receive a button 24 of triangular cross-section. It will further be apparent to a skilled person that buttons 24 may be provided along the whole length of cable 14.

Cover may be provided with a depending web along each of its axially outer which webs are adapted to frictionally engage a pair of complementary grooves extending in axial direction in top surface 33 of base 28. Thus, cover 26 and base 28 may be snapped together by way of these webs and grooves for retaining a button 24 in socket 32. The grooves may also be adapted to slidingly receive the webs of cover 26 so that cover 26 may be removably affixed to base 28 by moving it parallel top surface 33 in such a way that the webs axially slide into the grooves to be retained therein.

In still another preferred embodiment, lock 12 is not permanently affixed to cable 14 and includes a part of sockets 32. Thus, cable 14 may be laid around a bundle of lengths of material and the loop which is formed in cable 14 may be fastened by locking those two buttons 24 in lock 12 which are closest to the crossover point of cable 14 and are each affixed to different ends of the cable. In this embodiment, buttons 24 are provided along the whole length of cable 14. Alternatively, two locks 12 each including one socket 32 may be affixed together to each receive one of the two buttons 24 closest to the cross-over point of cable 14.

In a further preferred embodiment of the invention, buttons 24 of various shapes and sizes and a different lock 12 for each button variant are affixed to cable 14.

Still other ways of retaining a button 24 in socket 32 and of affixing lock 12 to cable 14 will be readily apparent to a person skilled in the art.

Button 24 may also be retained in socket 32 by means altogether different from the aforedescribed cover 26. For example, socket 32 may be deep enough to completely fittingly receive a button 24. A safety pin such as a cotter pin may be inserted into a safety pin bore which centrally extends through base 28 in a transverse direction. The safety pin bore is positioned so that a safety pin inserted therein comes to lay above and adjacent a button 24 placed in socket 32 in order to retain the button. In another preferred embodiment of the invention, base 28 of lock 12 includes a socket which is adapted to completely receive a button 24 and is provided, at an axial end, with a counterbore to at least partly fittingly receive an axial end of a button 24. Button 24 is retained in the counterbore of socket 32 when cable 14 is pulled from that axial end of lock 12 adjacent the counterbore. Base 28 may be further provided with a retaining member which may be clipped into socket 32 between a button 24 placed therein and that end of socket 32 opposite the counterbore so that button 24 is retained in the counterbore. The retaining member may be rotatably affixed to base 28 to be displaced between a disengaged position where button 24 may be selectively inserted into socket 32 and an engaged position where button 24 is retained in the counterbore. Thus, in this embodiment, button 24 may be disengaged from lock 12 by pulling a cable 14 from that axial end of lock 12 which is remote from the counterbore. Socket 32 may also be provided with a counterbore at each of its axial ends. In such an embodiment, button 24 is disengaged from lock 12 by moving cable 14 in an appropriate direction until button 24 does not engage either of the counterbores and may be removed from socket 32. In yet another preferred embodiment, buttons 24 have a tapered cross-section and socket 32 has a complementary tapered cross-section to fittingly receive a button 24 in such a way that button 24 will be frictionally retained in socket 32 when cable 14 is pulled from the tapered end of socket 32. Button 24 may be released by pulling cable 14 in the opposite direction.

In still a further preferred embodiment, a button 24 is retained in socket 32 by way of a clamp which is positioned in a transverse direction around lock 12.

Therefore, the cable lock assembly of the invention may be employed without the requirement for specific tools and is reusable thus reducing operating costs. Furthermore, the cable lock assembly of the invention provides a means for reliably securing a bundle of logs in a tightened condition, since cable 14 is substantially prevented from sliding through lock 12 in the closed condition of cover 26.

We claim:

1. A cable lock assembly for bundling logs, comprising:

a lock, a cable and at least one button affixed to said cable, said lock being affixable to said cable and including a base, a cover and a hinge rotatably connecting the base with the cover, said base having a top surface and a first cable groove extending across the top surface of the base, the first cable groove having a selected width for receiving at least part of the cross-section of the cable and having an intermediate section of greater with providing a socket for at least partly fittingly receiving one of said at least one button affixed to said cable, said cover being rotatable about the hinge between an open position wherein said one button and adjacent sections of the cable are selectively insertable into said socket and the first cable groove of the base respectively, and a closed position wherein said cover rests against the button for releasably retaining said button in said socket without squeezing the cable, thereby preventing said cable from slipping through said lock.

2. A cable lock assembly as defined in claim 1, further comprising means for releasably securing said cover to said base in said closed position.

3. A cable lock assembly as defined in claim 2, wherein the base has an eyelet and the cable has opposite ends, and an eye at an end for engaging the eyelet of the base to affix the cable lock to the cable.

4. A cable lock assembly as defined in claim 1, wherein said cover has a bottom surface including a second cable groove, the second cable groove having a selected width for receiving at least part of the cross-section of the cable and having an intermediate section of greater width providing a socket for fittingly receiving at least part of said button, the first cable groove being directly opposite the second cable groove when the cover is in the closed position, the first and second cable grooves receiving the button and the adjacent cable sections for preventing the cable from slipping through the lock without squeezing the cable when the cover is in the closed position.

5. A cable lock assembly as defined in claim 4, wherein said at least one button is permanently affixed to said cable through one of casting, welding and crimping.

6. A cable lock assembly as defined in claim 5, wherein the at least one button is cylindrical having a longitudinal axis parallel to an axis of the cable.

7. A cable lock assembly as defined in claim 2, wherein the cable has a pair of ends and the cable lock is permanently affixed to one end of the cable.

8. A cable lock assembly as defined in claim 1, wherein the first cable groove extends centrally across the top surface of the base.

9. A cable lock assembly as defined in claim 4, wherein the first and second cable grooves are symmetrical.

10. A cable lock assembly as defined in claim 9, wherein the button is cylindrical and the first and second cable grooves each have semi-circular cross-section.

11. A cable lock assembly as defined in claim 10, wherein the first and second cable grooves extend centrally across the top surface of the base and the bottom surface of the cover respectively.

12. A cable lock assembly as defined in claim 1, 3 or 4, wherein the button is completely enclosed by the cable lock when the cover is in the closed position.

13. A cable lock assembly as defined in claim 12, wherein a plurality of buttons are affixed to the cable in spaced apart relationship.

14. A cable lock assembly for bundling logs, comprising: a cable having a pair of opposite ends; and
a button secured to the cable,
a cable lock;
the cable lock being affixed to one end of the cable and including a base, a cover and a hinge rotatably connecting the base with the cover, the base having a top surface and a first cable groove extending across the top surface, the first cable groove having a selected width for receiving at least part of the cross-section of the cable and having an intermediate section of greater width providing a socket for at least partly fittingly receiving said button affixed to the cable, the cover being rotatable about the hinge between an open position wherein the button and adjacent sections of the cable are selectively insertable into the socket and the first cable groove of the base, respectively, and a closed position wherein the cover retains the button in the socket without forceably retaining the cable, for preventing the cable from slipping through the lock thereby substantially preventing damage to the cable by the cable lock, and the button being spaced from the lock along the cable so that a loop is formed in the cable when the button is received in the socket.

15. In combination with a bundle of logs a cable lock assembly, comprising
a cable having a pair of opposite ends; and
a button secured to the cable,
a cable lock;
the cable lock being affixed to one end of the cable and including a base, a cover and a hinge rotatably connecting the base with the cover, the base having a top surface and a longitudinal first cable groove extending across the top surface, the first cable groove having a selected width for receiving at least part of the cross-section of the cable and having an intermediate section of greater width providing a socket for at least partly fittingly receiving a button affixed to the cable, the cover being rotatable about the hinge between an open position wherein the button and adjacent sections of the cable are selectively insertable into the socket and the first cable groove of the base, respectively, and a closed position wherein the cover retains the button in the socket for preventing the cable from slipping through the lock without squeezing the cable thereby substantially preventing damage to the cable by the cable lock, and the button being spaced from the lock along the cable so that a loop is formed in the cable around the bundle of logs when the button is received in the socket.

* * * * *

UNITED STATES PATENT AND TRADEMARK OFFICE
CERTIFICATE OF CORRECTION

PATENT NO.   : 5,181,402
DATED        : January 26, 1993
INVENTOR(S)  : COURT FAESSLER ET AL It is certified that error appears in the above-indentified patent and that said Letters Patent is hereby corrected as shown below:

Claim 1, column 6, line 16, delete "with" and substitute therefor ---width---.

Signed and Sealed this

Ninth Day of August, 1994

Attest:

BRUCE LEHMAN

Attesting Officer

Commissioner of Patents and Trademarks